United States Patent
Liu et al.

(10) Patent No.: US 10,311,017 B2
(45) Date of Patent: Jun. 4, 2019

(54) RECONFIGURABLE PROCESSOR AND TIMING CONTROL METHOD THEREOF

(71) Applicant: Tsinghua University, Beijing (CN)

(72) Inventors: Leibo Liu, Beijing (CN); Youyu Wu, Beijing (CN); Shaojun Wei, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 15/922,511

(22) Filed: Mar. 15, 2018

(65) Prior Publication Data

US 2018/0267928 A1    Sep. 20, 2018

(30) Foreign Application Priority Data

Mar. 17, 2017  (CN) .......................... 2017 1 0161517

(51) Int. Cl.
*G06F 15/76* (2006.01)
*G06F 15/78* (2006.01)

(52) U.S. Cl.
CPC .......... *G06F 15/7892* (2013.01); *G06F 15/76* (2013.01); *G06F 15/7867* (2013.01); *G06F 15/7871* (2013.01)

(58) Field of Classification Search
CPC ............. G06F 15/7867; G06F 15/7871; G06F 15/7878; G06F 15/7892; G06F 15/76
See application file for complete search history.

(56) References Cited

U.S. PATENT DOCUMENTS 6,150,839 A * 11/2000 New ................ H03K 19/17752
                                                          326/38

FOREIGN PATENT DOCUMENTS

| CN | 102411555 | 4/2012 |
|---|---|---|
| CN | 102541809 | 3/2015 |
| WO | 2008142767 | 11/2008 |

OTHER PUBLICATIONS

Teifel, An asynchronous dataflow FPGA architecture, Nov. 2004, IEEE Transactions on Computers, vol. 53 No. 11, 17 pages (Year: 2004).*

(Continued)

*Primary Examiner* — Jyoti Mehta
(74) *Attorney, Agent, or Firm* — Hamre, Schumann, Mueller & Larson, P.C.

(57) ABSTRACT

The present disclosure provides a reconfigurable processor and a timing control method thereof. The reconfigurable processor comprises a reconfigurable cell array (RCA) including a plurality of reconfigurable cells (RCs) and a control unit; the control unit is configured to generate and send a timing control information to the RCA; and the RCA is configured to execute an operation task according to the timing control information, wherein the RC in the RCA starts to execute an operation when receiving the timing control information, and delivers the timing control information to a next level of RC within the RCA according to a preset order after the operation is completed; and when the RCA completes the operation task corresponding to the timing control information, the RCA destroys the timing control information, wherein the operation task includes operations executed by each level of the RCs receiving the timing control information. According to embodiments of the present disclosure, the operation efficiency of the RCA is improved, thereby optimizing the performance of the processor.

18 Claims, 4 Drawing Sheets

(56) References Cited

OTHER PUBLICATIONS

Zhu Min et al, Timing parameter analysis of critical loop to reconfigurable array mapping (English Translation), Nov. 2012, Computer Engineering, vol. 38 No. 22, 19 pages (Year: 2012).*
Chinese Office Action issued in the corresponding Chinese patent application No. 201710161517.2, dated Aug. 15, 2018, 12 pages.
Zhu et al., "Timing Parameter Analysis of Critical Loop to Reconfigurable Array Mapping", Computer Engineering, vol. 38, No. 22, Nov. 2012, 4 pages (abstract enclosed).
Second Chinese Office Action, issued in the corresponding Chinese Patent application No. 201710161517.2, dated Oct. 31, 2018, 7 pages.

* cited by examiner

RECONFIGURABLE PROCESSOR AND TIMING CONTROL METHOD THEREOF

CROSS-REFERENCE TO RELATED APPLICATION(S)

This application claims priority to a Chinese Patent Application No. 201710161517.2, filed with the Chinese Patent Office on Mar. 17, 2017 and entitled "reconfigurable processor and timing control method thereof", which are incorporated herein by reference entirely.

TECHNICAL FIELD

The present disclosure relates to the field of microelectronic technology, and more particularly, to a reconfigurable processor and a timing control method thereof.

BACKGROUND

Cryptographic processor chip is a commonly used cryptographic processing device, mainly used for encryption of data using encryption algorithm. Cryptographic processor chips can mainly be divided into two categories in terms of architecture and design method. The first category is based on Application Specific Integrated Circuits (ASICs) and the second category is based on Instruction Set Architecture Processors (ISAPs). Among them, the ASIC method tends to be optimized for an algorithm, and thus the computing speed is far faster than the ISAP method. However, after the design in the ASIC method is completed, the hardware structure cannot be changed and cannot meet the flexibility requirements of the application scenario of password, thus once it is cracked, it can only be discarded. Meanwhile, the biggest advantage of a cryptographic processor implemented by ISAP is in terms of functional flexibility. This flexibility is often obtained at the expense of energy efficiency. That is, it is very difficult for such processors to overcome the major defect of low energy efficiency.

In order to balance the flexibility and energy efficiency, the reconfigurable processor has emerged based on ASIC and ISAP. The reconfigurable processor can strike a balance between ASIC and ISAP processors to achieve the best compromise for application.

Specifically, in the reconfigurable processor in the prior art, each reconfigurable cell (RC) is connected to a routing unit, and the routing unit controls input and output of the RC. The RCs may be configured to connect together with adjacent RCs to exchange data with each other. Also, the RCs may communicate directly with outside via First In First Out (FIFO) registers, or be directly connected to array cache for storage.

In order to improve the performance of the processor, the reconfigurable processor in the prior art often performs acceleration design through the pipeline technology, and can increase the data processing speed with less hardware resources. However, due to the adoption of the pipeline technology, the reconfigurable processor can only work under a synchronous timing, which prevents the reconfigurable processor from achieving its optimal performance and increases the possibility that the processor is physically attacked.

SUMMARY

The present invention aims to at least solve one of the technical problems in the related art to some extent.

For this reason, a first object of the present disclosure is to propose a reconfigurable processor that can optimize the performance of the processor to a certain extent while ensuring the flexibility.

The second object of the present disclosure is to propose a timing control method of a reconfigurable processor.

To achieve the above object, an embodiment of the first aspect of the present disclosure provides a reconfigurable processor, the reconfigurable processor comprises a reconfigurable cell array (RCA) including a plurality of reconfigurable cells (RCs) and a control unit: wherein the control unit is configured to generate and send a timing control information to the RCA; and the RCA is configured to execute an operation task according to the timing control information, wherein the RC in the RCA starts to execute an operation when receiving the timing control information, and delivers the timing control information to a next level of RC within the RCA according to a preset order after the operation is completed; and when the RCA completes the operation task corresponding to the timing control information, the RCA destroys the timing control information; wherein the operation task includes operations executed by each level of the RCs receiving the timing control information.

In the reconfigurable processor according to the embodiments of the present disclosure, the timing control information is delivered among the RCs included in the RCA so that each RC executes asynchronous operation according to the timing control information. Compared with the synchronous timing operation, the flexibility of the RC operation is enhanced and the operation efficiency of the RCA is improved, thereby optimizing the performance of the processor.

To achieve the above object, an embodiment of the second aspect of the present disclosure provides a timing control method of a reconfigurable processor, the reconfigurable processor comprises a reconfigurable cell array (RCA) including a plurality of reconfigurable cells (RCs) and a control unit, wherein the timing control method comprises: the control unit generates and sends a timing control information to the RCA; the RC in the RCA starts to execute an operation when receiving the timing control information, and delivers the timing control information to a next level of RC within the RCA according to a preset order after the operation is completed; and when the RCA completes operation task corresponding to the timing control information, the RCA destroys the timing control information, wherein the operation task includes operations executed by each level of the RCs receiving the timing control information.

In the timing control method of a reconfigurable processor according to the embodiments of the present disclosure, the timing control information is delivered among the RCs included in the RCA so that each RC executes asynchronous operation according to the timing control information. Compared with the synchronous timing operation, the flexibility of the RC operation is enhanced and the operation efficiency of the RCA is improved, thereby optimizing the performance of the processor.

Additional aspects and advantages of the present disclosure will be set forth in part in the description which follows and, in part, will be apparent from the description below, or may be learned by practice of the present disclosure.

BRIEF DESCRIPTION OF THE DRAWINGS

The foregoing and/or additional aspects and advantages of the present disclosure will become apparent and readily appreciated from the following description of the embodiments in connection with the accompanying drawings, in which.

DETAILED DESCRIPTION

Figure 1:
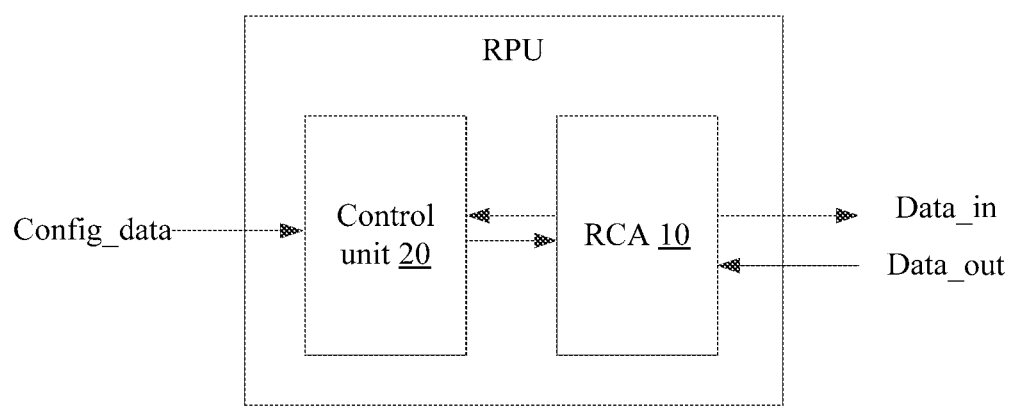
FIG. 1 is a schematic structural diagram of a reconfigurable processor according to an embodiment of the present disclosure.

The embodiments of the present disclosure will be described in detail hereinafter, and examples of the embodiments are illustrated in the accompanying drawings, wherein the same or similar reference numerals denote the same or similar elements or elements having the same or similar functions throughout. The embodiments described hereinafter with reference to the accompanying drawings are exemplary and are intended to explain the present disclosure and are not to be construed as limiting the present disclosure.

The reconfigurable processor and the timing control method of the reconfigurable processor according to the embodiment of the present disclosure will be described hereinafter with reference to the accompanying drawings.

A reconfigurable processor is provided according to an embodiment of the present disclosure. FIG. 1 is a schematic structural diagram of a reconfigurable processor according to an embodiment of the present disclosure. As shown in FIG. 1, the reconfigurable processor includes a reconfigurable cell array (RCA) 10 and a control unit 20. The RCA 10 includes a plurality of RCs.

Specifically, the control unit 20 is configured to generate and send a timing control information to the RCA 10. The RCA 10 is configured to execute an operation task based on the timing control information. The RC in the RCA 10 starts to execute an operation when receiving the timing control information, and delivers the timing control information to a next level of RC within the RCA according to a preset order after the operation is completed. When the RCA 10 completes the operation task corresponding to the timing control information, the timing control information is destroyed.

It should be noted that the operation task includes operations executed by each level of the RCs receiving the timing control information. In an operation task, the operations executed by each RC are asynchronous, and the operations executed asynchronously together form an operation process.

As a possible implementation manner, the preset order comprises that the timing control information is delivered from an upper level of RC to a lower level of RC, or delivered arbitrarily between the RCs of the same level in the RCA.

Here, each level of the RCs comprises at least one RC, or comprises at least one row of RCs, or comprises a sub-array of at least one RC.

Because both the preset order and the composition of each level of the RCs have a degree of flexibility, a degree of flexibility can be provided to the RCA to help optimize the performance of the processor.

Further, the RCA 10 is specifically configured to write the execution result of the operation task into an output first-in-first-out (OFIFO) register and/or a memory (MEM) and destroy the timing control information by the RC that receives the timing control information last in the RCA 10, when the operation task corresponding to the timing control information is completed.

In the reconfigurable processor according to the embodiments of the present disclosure, the timing control information is delivered among the RCs included in the RCA so that each RC executes asynchronous operation according to the timing control information. Compared with the synchronous timing operation, the flexibility of the RC operation is enhanced and the operation efficiency of the RCA is improved, thereby optimizing the performance of the processor.

As shown in FIG. 1, the control unit may receive the configuration information Config_data from the outside in real time, and may also receive the configuration information Config_data in advance and store it in its memory. The RCA receives input data Data_in from the outside during operation, and outputs the operation result Data_out or stores it in its internal memory after the operation is completed.

Figure 2:
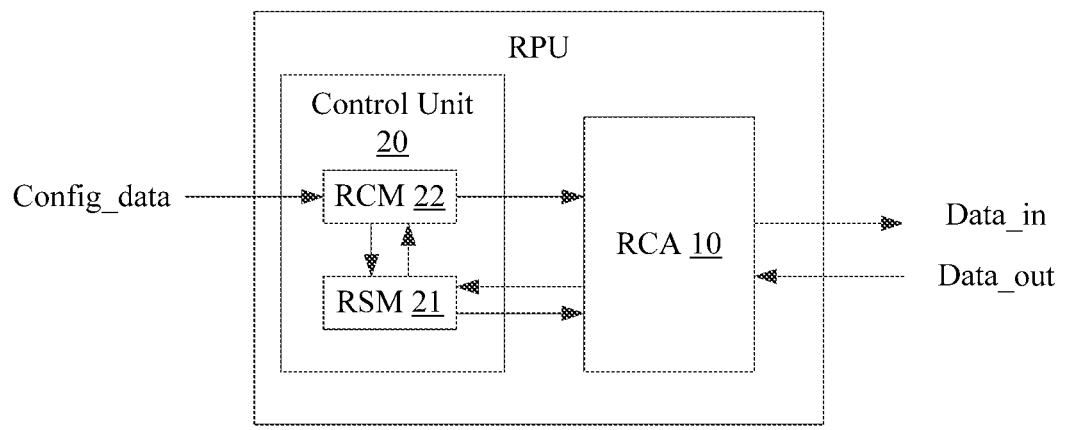
FIG. 2 is a schematic structural diagram of another reconfigurable processor according to an embodiment of the present disclosure.

Further, in an embodiment, the control unit 20 may include a Reconfigurable Schedule Manager (RSM) 21 and a Reconfigurable Configuration Manager (RCM) 22. FIG. 2 is a schematic structural diagram of another reconfigurable processor according to an embodiment of the present disclosure. As shown in FIG. 2, the RCM 22 is connected to the RCA 21. The RCM 22 is configured to parse configuration information Config_data and send a result of parsing to the RCA 10 to configure the operation function of at least a part of the RCs in the RCA 10. It can be seen that the RC is mainly configured to implement the operation under the configuration of the RCM 22, so the RC is also referred to herein as an operator.

It should be noted that, in particular implementation, the control unit 20 may implement the function of the RCM 22 and the RSM 21, i.e., the RCM 22 and the RSM 21 may be integrated in the same unit, or the control unit 20 may be further split into more modules.

In particular, in an embodiment, the RCA 10 includes a reconfigurable computing data channel and a storage unit. The reconfigurable computing data channel is composed of the RC array, and the storage unit includes FIFO and MEM.

In an embodiment, in the application scenario of implementing the encryption function, based on the reconfigurable processor provided in FIG. 2, the RCA 10 receives the input data to be encrypted, Data_in, from the outside, and then implements various cryptographic algorithm operations and the storage of intermediate data under the control of the RSM 21 and the RCM 22. After the operation is completed, encrypted data, Data_out, is stored in the OFIFO in the FIFO to send the processing result to the outside through the OFIFO. It should be understood that storing and delivering encrypted data through the OFIFO is only one embodiment of the present disclosure, and the protection scope of the present disclosure is not limited thereto.

Further, for the sake of saving energy, in an embodiment, the RCA 10 is also configured to turn off the power and clock of an idle RC.

To clearly illustrate the control process on the RCA 10 by the RSM 21 and the RCM 22 in this embodiment, the RSM 21 and the RCM 22 will be emphatically described below.

Specifically, as shown in FIG. 2, the RCM 22 receives the configuration information, Config_data, from the outside, stores and parses the configuration information and then sends it to the RCA 10 to configure the function of at least a part of the RC operators in the RCA 10, so that the part of the RCs execute the corresponding operation. In this way, the reconfigurable processor realizes the function corresponding to the configuration information through the configured part of the operators.

Alternatively, the above configuration information may be pre-stored in the RCM 22, and may also be updated according to user requirements. The configuration information stored in the RCM 22 may include multiple sets of configuration information corresponding to multiple functions, and each set of configuration information may include data configuration information and computing manipulation configuration information. For example, computing manipulation configuration information includes information for configuring operator functions and timing and the like. According to the current functional requirements, the RCM 22 can select corresponding configuration information and send it to the RCA 10 to configure the function of the RCA 10.

It should be noted that the foregoing functions include, but are not limited to, various functions that can be implemented by the reconfigurable processor in this embodiment, such as data processing and image processing. For example, taking the encryption function as an example, it is assumed that the configuration information in the RCM 22 includes the configuration information corresponding to various encryption algorithms, so that the RCM 22 may parse and select one or more encryption algorithms to send to the RCA 10 according to the current encryption requirement, to configure the function of at least a part of the operators in the RCA 10. In this way, after the configuration is completed, the RCA 10 encrypts the input data, Data_in, according to the configured encryption algorithm, and then outputs the encrypted data, Data_out.

In addition, the RCM 22 which is connected to the RSM 21 is also configured to send the computing manipulation configuration information to the RSM 21 so that the RSM 21 generates corresponding timing control information.

The RSM 21 is configured to receive the configuration information, specifically, the computing manipulation configuration information in the configuration information, from the RCM 22, and generate the timing control information according to the configuration information.

Alternatively, the RSM 21 may receive the computing manipulation configuration information from the RCM 22 dynamically. In this way, the RSM 21 generates the timing control information according to the computing manipulation configuration information and outputs the timing control information to the RCA 10, so as to realize the timing control during the operation of the RCA 10. The computing manipulation configuration information may include a cyclic token ring length and a cyclic token bubble and the like, and the timing control information includes a token (TOK).

Further, the operation process controlled by the RSM 21 includes not only the operation timing of the RCA 10 but also the timing of data access of the FIFO provided inside the RCA 10 and the timing of data manipulation of the MEM provided inside the RCA 10.

Specifically, in an embodiment, the RSM 21 is also configured to perform a corresponding control in case an abnormality occurs in the MEM, OFIFO and/or RCM 22.

In a practical application scenario, a blocking occurs in the MEM and/or OFIFO. In this case, the RSM 21 stops generating the token and generates a first blocking signal. Accordingly, when the RC in the RCA 10 receives the first blocking signal, the corresponding operation is suspended.

In another application scenario, the RCM 21 generates a second blocking signal when the parsing of a clock cycle has not been completed at the time the clock cycle arrives. When the RSM 21 monitors that the RCM 22 has generated the second blocking signal, it stops generating the token. Accordingly, when the RC in the RCA 10 receives the second blocking signal, the corresponding operation is suspended.

It should be noted that, under normal circumstances, the RCM 22 should have completed the parsing of a clock cycle at the time the clock cycle arrives, and switch the RC that has executed the operation corresponding to the timing control information to a configuration required for a next operation task.

Further, in an embodiment, the RSM 21 generates the timing control information required by the RCA 10 to execute the current function according to the computing manipulation configuration information, and then sends the timing control information to the RCA 10. The RCA 10 executes the corresponding operation function according to the received timing control information and returns an execution result to the RSM 21 during the execution so that the RSM 21 may further perform timing control on the RCA 10 according to the returned execution result. Alternatively, the RSM 21 sends a release signal of each level of the RCs to the RCM 22 when the execution result of the RCA 10 is obtained. Accordingly, the RCM 22 switches each level of the RCs corresponding to the release signal to a configuration required for a next operation task when receiving the release signal.

Figure 3:
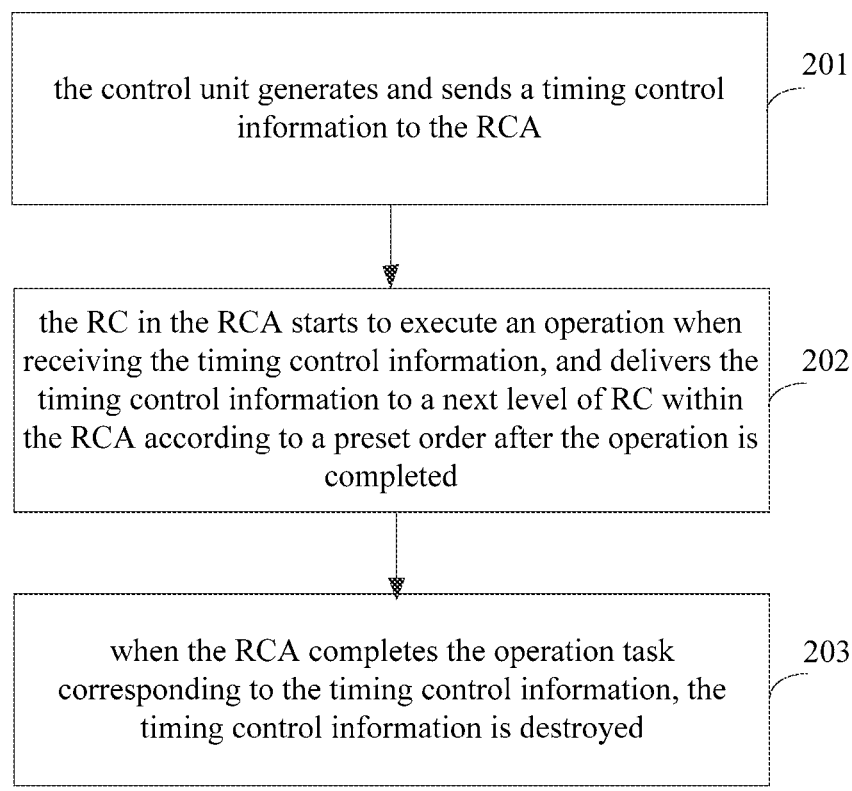
FIG. 3 is a schematic flowchart of a timing control method of a reconfigurable processor according to an embodiment of the present disclosure.

In order to clearly describe the reconfigurable processor provided in the foregoing embodiment, a timing control method of a reconfigurable processor is further provided according to an embodiment of the present disclosure. The timing control method may be executed by the reconfigurable processor shown in FIG. 1. Specifically, FIG. 3 is a schematic flowchart of a timing control method of a reconfigurable processor according to an embodiment of the present disclosure. The method includes the following steps:

Step 201: the control unit generates and sends a timing control information to the RCA.

In an embodiment, the timing control information includes a token.

Step 202: the RC in the RCA starts to execute an operation when receiving the timing control information, and delivers the timing control information to a next level of RC within the RCA according to a preset order after the operation is completed. In an embodiment, the preset order comprises that the timing control information is delivered from an upper level of RC to a lower level of RC, or delivered arbitrarily between the RCs of the same level in the RCA.

Step 203: when the RCA completes the operation task corresponding to the timing control information, the timing control information is destroyed. In an embodiment, the operation task includes operations executed by each level of the RCs receiving the timing control information.

Alternatively, the RC that receives the timing control information last in the RCA writes the execution result of the operation task into the OFIFO and/or MEM and destroys the timing control information, when the operation task corresponding to the timing control information is completed.

In the reconfigurable processor according to the embodiments of the present disclosure, the timing control information is delivered among the RCs included in the RCA so that each RC executes asynchronous operation according to the timing control information. Compared with the synchronous timing operation, the flexibility of the RC operation is enhanced and the operation efficiency of the RCA is improved, thereby optimizing the performance of the processor.

To clearly illustrate the timing control method of the reconfigurable processor, the timing control method will be described in detail based on the reconfigurable processor provided in FIG. 2.

Figure 4:
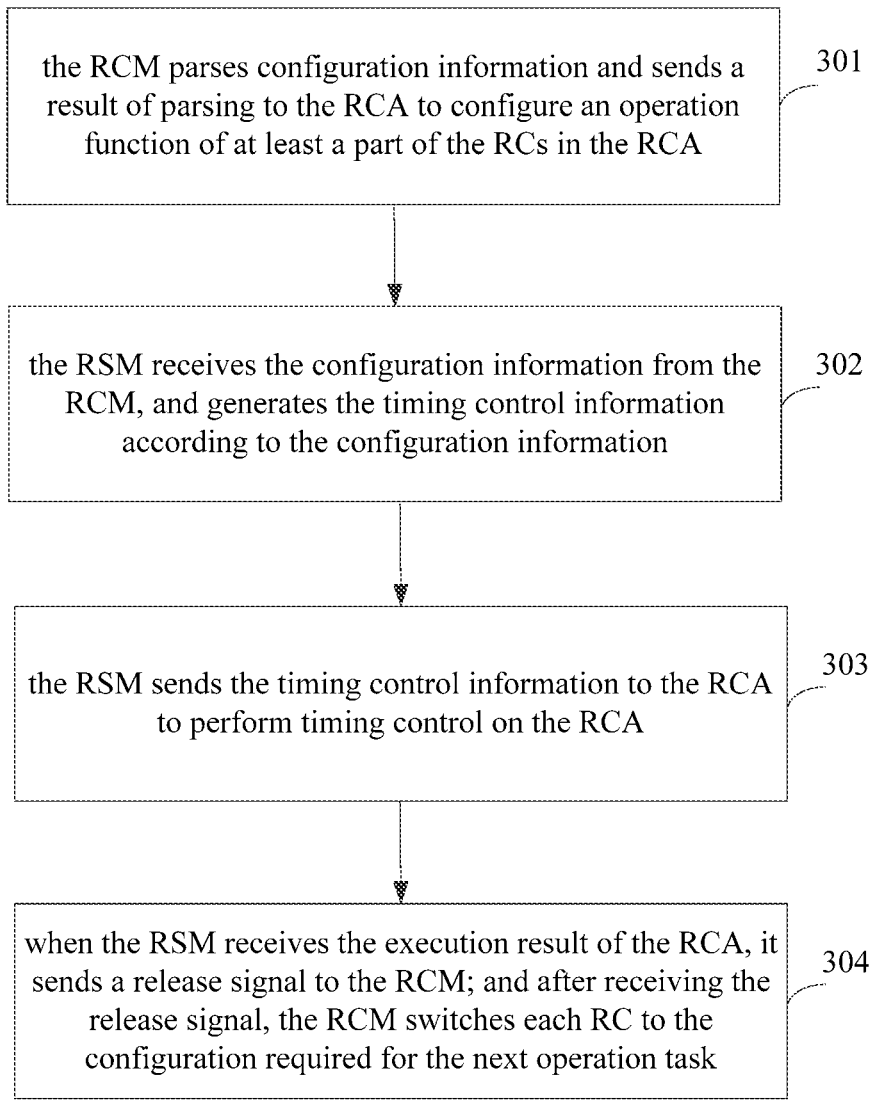
FIG. 4 is a schematic flowchart of another timing control method of a reconfigurable processor according to an embodiment of the present disclosure.

Specifically, when the RCA performs each operation task, it needs to go through three stages: generation, propagation and destruction of the timing control information. However, the RCA needs to be configured before it performs an operation task. Specifically, FIG. 4 is a schematic flowchart of another timing control method of a reconfigurable processor according to an embodiment of the present disclosure. The method includes:

Step 301: the RCM parses configuration information and sends a result of parsing to the RCA to configure operation function of at least a part of the RCs in the RCA.

Alternatively, the configuration information may be pre-stored in the RCM, and may also be updated according to user requirements. The configuration information stored in the RCM may include multiple sets of configuration information corresponding to multiple functions, and each set of configuration information may include data configuration information and computing manipulation configuration information. For example, computing manipulation configuration information includes information for configuring operator functions and timing and the like. According to the current functional requirements, the RCM can select corresponding configuration information and send it to the RCA 10 to configure the function of the RCA 10.

Step 302: the RSM receives the configuration information from the RCM, and generates the timing control information according to the configuration information. Specifically, in an embodiment, the RSM generates the timing control information when the RSM generates the read enable signal of the MEM and/or the OFIFO during the generation stage of the timing control information. In this embodiment, the mentioned timing control information may be specifically a token.

As a possible implementation, a gap_cnt counter may be set for each operation task within the RSM. A read enable signal of the MEM and/or the OFIFO is generated when the counter counts to i_procx_gap, and a token is generated accordingly. When a blocking occurs in the MEM/OFIFO, the gap_cnt counter suspends counting, thereby stopping the generation of the token. i_procx_gap may be a preset natural number.

For example, i_procx_gap for operation task 0 has a value of 3, and there is a counter from 0 to 3 within the RSM. When the operation task 0 is enabled, the counter starts counting. A read enable signal of the MEM and/or the OFIFO is generated according to the cycle of the counter, and a token is generated accordingly.

Step 303: the RSM sends the timing control information to the RCA to perform timing control on the RCA. Specifically, during the propagation phase of the timing control information, the RC in the RCA receives the timing control information generated by the control unit. The RC that has received the timing control information performs the corresponding operation according to the timing control information and delivers the timing control information level by level according to the preset delivery order among the RCs included in the RCA after the operation is completed.

Preferably, each level includes an RC, that is, timing control is performed at a single RC granularity, but this consumes relatively more control resources. Therefore, in practice, timing control is performed at a row granularity, that is, each level includes a row of RCs.

For example, the RCA array has a total of $2^N$ rows and each row corresponds to a row enable signal. The RCs of a row can perform the computation only when the corresponding row enable signal has a value of 1. When the row enable signal has a value of 0, the RC output of the row is latched and the computation cannot continue.

The row enable signal here means that a token is generated when the counter in the RSM counts to i_procx_gap. The value of the token is 1, and the RSM generates a row enable signal corresponding to an operation task synchronously. After performing a logic operation on the token and the row enable signal, the row enable signal of the RCs of the row is 1, and the RCs of the row can execute the corresponding operation. After the corresponding operation is completed in this way, the RCs of the row may deliver the token to the RCs of the next row.

Figure 5:
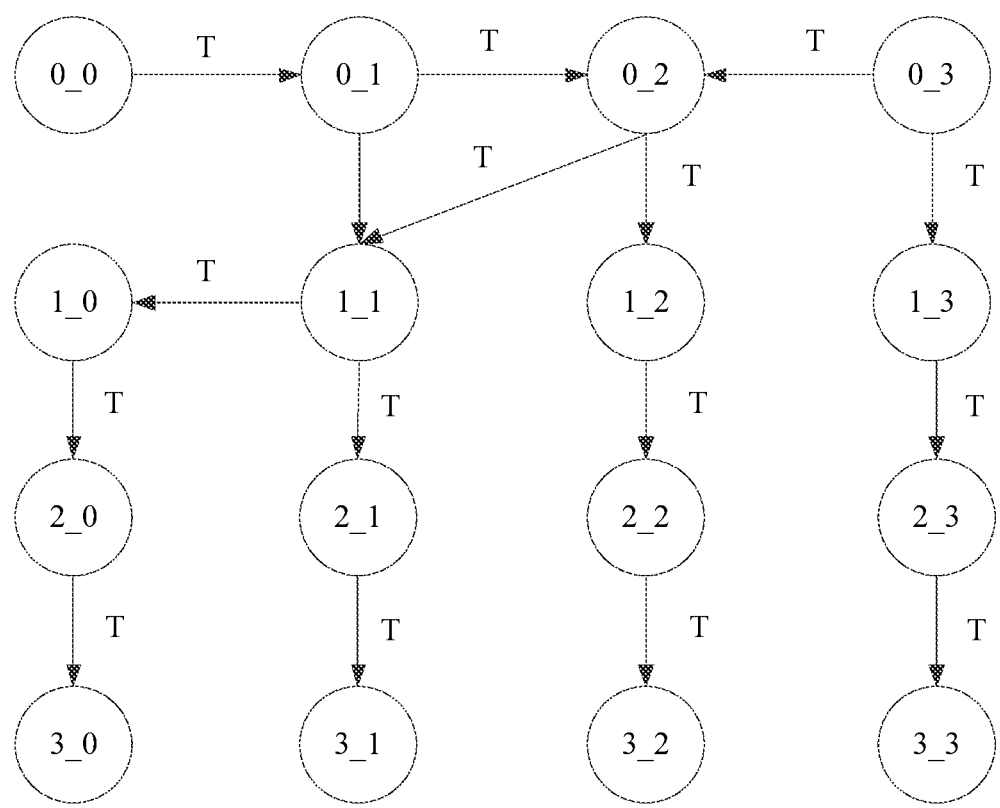
FIG. 5 is a schematic diagram illustrating the token delivery.

For another example, FIG. 5 is a schematic diagram of token delivery. As shown in FIG. 5, each dot corresponds to a RC. The numbers before the "_" in the circles are the row numbers, the numbers after the "_" are the column numbers, and the RCs are represented by the rows and columns. The direction of the arrow corresponds to the delivery direction of the token (T). After each RC completes the operation, it delivers the token to the next RC. As shown in FIG. 5, the token may be delivered in the following directions: from left to right, or from right to left within a row; and only from an upper row to a lower level between the rows. In FIG. 5, the division of the sub-arrays, that is, the division of the blocks, is not shown. If the sub-arrays are also divided in practice, the delivery from any one of the blocks to any one of the blocks may be implemented.

It can be seen that there is no restriction on the order of token delivery within a row or within a sub-array. However, between the rows, the token can only be delivered from an upper level of operating RC to a lower level of operating RC. Thus, the token may be delivered flexibly within the RCA and the operation efficiency of the RCA is improved, thereby improving the performance of the processor.

As an abnormal situation, since the intermediate operation result and the final operation result need to be stored by using the storage unit, when a blocking occurs in the MEM and/or the OFIFO in the storage unit, the RSM stops generating the token and starts to generate a first blocking signal. When the RC in the RCA receives the first blocking signal, the corresponding operation is suspended. For example, when a blocking occurs, the aforementioned gap_cnt counter suspends counting, the RSM generates a block_flag signal, and suspends token generation.

Step 304: when the RSM receives the execution result of the RCA, it sends a release signal to the RCM. After receiving the release signal, the RCM switches each RC to the configuration required for the next operation task.

Specifically, during the destruction stage of the timing control information, when the operation task corresponding to the timing control information is completed by the RCA, the RC that receives the timing control information last in the RCA writes the execution result of the operation task into the OFIFO and/or MEM and releases the timing control information. Further, when the RSM receives the execution result of the RCA, it sends a release signal to the RCM. After receiving the release signal, the RCM switches each RC to the configuration required for the next operation task.

It can be seen that, each RC operator in the RC array is controlled asynchronously using token flow, and each RC operator may corresponds to a 1-bit token enabling. A RC can perform operation tasks only when the corresponding token is enabled. When the current operation is completed, the token is delivered to the next level of RC. In this way, the timing of the RC array is controlled by controlling the generation, destruction, and delivery of the token. Thus, scheduling and timing control of each RC operator in the RC array is accomplished.

When the timing control is performed with a 1-bit token corresponding to a RC respectively, it is possible to achieve flexible control of each RC operator. Further, in order to facilitate the management of the RC, the entire RCA may be divided into several sub-arrays, and each sub-array implements the corresponding function respectively. In other words, the entire RCA may map one set of algorithm, or multiple sets of algorithms simultaneously, increasing the flexibility and utilization of the RC array.

Further, since each RC in the entire RCA is timing-controlled based on tokens, the RCA may be designed as an asynchronous combinational circuit without timing information. In the meantime, since a part of idle RCs are not involved in the operation task during the foregoing process, power and clocks may be turned off for the idle RCs in the RCA for the purpose of improving performance and reducing power consumption.

In a possible implementation, after the RCs finish the operation, the RSM may be released in a row or in a sub-array or by a single RC, and the released RCs may also be reconfigured by the RCM to perform a new operation. Since each RC is timing-controlled based on a token, the configuration of the RC may be switched as the token is delivered or destroyed when the RC completes its operation task. This realizes the local dynamic configuration switch, without having to wait until the entire RC or RCA to complete the corresponding operation tasks. It can be seen that, in the function configuration, the embodiments of the present disclosure do not interrupt the operation tasks being performed by the RCA, and reduce the impact of the configuration time on the operation tasks, thereby improving the working efficiency of the processor.

As another abnormal situation, the RCM does not finish the parsing of a clock cycle when the clock cycle arrives, that is, the parsing speed is slower than the speed of the operation. This anomaly is caused because the configuration parsing required for the next operation is not completed after the present operation is completed. In this case, the RCM generates a second blocking signal. When the RC in the RCA receives the second blocking signal, the corresponding operation is suspended.

In the timing control method of the reconfigurable processor according to the embodiments of the present disclosure, the timing control information is delivered among the RCs included in the RCA so that each RC executes asynchronous operation according to the timing control information. Compared with the synchronous timing operation, the flexibility of the RC operation is enhanced and the operation efficiency of the RCA is improved, thereby optimizing the performance of the processor.

The timing control method provided in this embodiment is executed by the reconfigurable processor provided by the foregoing embodiment. For related content, reference may be made to the description in the foregoing apparatus embodiment, and details are not described in this embodiment.

In the description of the present specification, the description of the terms "one embodiment," "some embodiments," "an example," "a specific example," or "some examples" and the like means the specific characteristics, structures, materials, or features described in connection with the embodiment or example are included in at least one embodiment or example of the present disclosure. In the present specification, a schematic expression of the above terms does not necessarily refer to the same embodiment or example. Furthermore, the particular features, structures, materials, or characteristics described may be combined in any suitable manner in any one or more of the embodiments or examples. In addition, different embodiments or examples and features thereof described in this specification may be united and combined by those skilled in the art without mutual contradiction. In the description of the present disclosure, "a plurality of" means at least two, for example, two, three, etc., unless expressly limited otherwise.

Any process or method descriptions described in flowcharts or otherwise herein may be understood as representing modules, segments or portions of code that include one or more executable instructions for implementing the steps of a custom logic function or process, and the scope of the preferred embodiments of the disclosure includes additional implementations where the functions may not be performed in the order shown or discussed, including according to the functions involved, in substantially simultaneous or in reverse order, which should be understood by those skilled in the art to which the embodiment of the present disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, apparatus, or device (such as a computer-based system, a system that includes processors, or other systems that may fetch instructions from an instruction execution system, apparatus, or device and execute the instructions). As for this specification, a "computer-readable medium" may be any apparatus that can contain, store, communicate, propagate, or transport the program for use by or in connection with the instruction execution system, apparatus, or device. More specific examples (not a non-exhaustive list) of computer-readable medium include the following: electrical connection (electronic device) having one or more wires, portable computer disk cartridge (magnetic device), random access memory (RAM), Read only memory (ROM), erasable programmable read only memory (EPROM or flash memory), optical fiber device, and portable compact disc read only memory (CDROM). In addition, the computer-readable medium can even be paper or other suitable medium upon which the program can be printed, as it may be read, for example, by optical scanning of the paper or other medium, followed by editing, interpretation or, where appropriate, processing in other suitable ways to electronically obtain the program, which is then stored in a computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware as in another embodiment, any of the following techniques well known in the art, or a combination thereof may be used: discrete logic with logic gates for implementing logic functions on data signals, application specific integrated circuits with suitable combinational logic gates, programmable gate arrays (PGA), field programmable gate arrays (FPGAs), and the like.

A person of ordinary skill in the art may understand that, by indicating related hardware through a program, all or a part of the steps of the method in the foregoing embodiment may be implemented, and the program may be stored in a computer-readable storage medium. When the program is executed, one of the steps of the method embodiments or a combination thereof is included.

In addition, each of the functional units in the embodiments of the present disclosure may be integrated in one processing module, or each of the units may exist alone physically, or two or more units may be integrated in one module. The above-mentioned integrated module may be implemented in the form of hardware or in the form of software functional module. When the integrated module is implemented in the form of a software function module and is sold or used as an independent product, the integrated module may also be stored in a computer readable storage medium.

The above-mentioned storage medium may be a read only memory, a magnetic disk, an optical disk, or the like. Although the embodiments of the present disclosure have been shown and described above, it should be understood that the above embodiments are merely exemplary and should not be construed as limiting the present disclosure. The above embodiments may be changed, modified, replaced, and varied by those skilled in the art within the scope of the present disclosure.

What is claimed is:

1. A reconfigurable processor, wherein the reconfigurable processor comprises a reconfigurable cell array RCA including a plurality of reconfigurable cells RCs and a control unit including a reconfigurable configuration manager RCM and a reconfigurable schedule manager RSM, wherein
    the RCM is configured to parse a configuration information and send a result of the parsing to the RCA to configure an operation function of at least a part of the RCs in the RCA;
    the RSM is configured to receive the configuration information from the RCM, to generate timing control information according to the configuration information, and to send the timing control information including a token to the RCA; and
    the RCA is configured to execute an operation task according to the timing control information, wherein an RC in the RCA starts to execute an operation when receiving the timing control information, and delivers the timing control information to a next level of RC within the RCA according to a preset order after the operation is completed; and when the RCA completes the operation task corresponding to the timing control information, the RCA destroys the timing control information, wherein the operation task includes operations executed by each level of the RCs receiving the timing control information.

2. The reconfigurable processor according to claim 1, wherein
    the RSM is further configured to stop generating the token and generate a first blocking signal when a blocking occurs in a memory MEM and/or an output first-in-first-out register OFIFO; and
    the RCA is further configured to suspend a corresponding operation when the RC in the RCA receives the first blocking signal.

3. The reconfigurable processor according to claim 2, wherein
    the RCM is further configured to generate a second blocking signal when parsing of a clock cycle has not been completed at the time the clock cycle arrives; and
    the RCA is further configured to suspend a corresponding operation when the RC in the RCA receives the second blocking signal.

4. The reconfigurable processor according to claim 3, wherein
    the RSM is further configured to stop generating the token when the RSM monitors that the RCM generates the second blocking signal.

5. The reconfigurable processor according to claim 2, wherein
    the RCM is further configured to switch the RC that has executed an operation corresponding to the timing control information to a configuration required for a next operation task when parsing of a clock cycle has been completed.

6. The reconfigurable processor according to claim 1, wherein
    the RCA is specifically configured to write an execution result of the operation task into OFIFO and/or MEM and destroy the timing control information by the RC that receives the timing control information last in the RCA, when the operation task corresponding to the timing control information is completed.

7. The reconfigurable processor according to claim 1, wherein
    the RSM is further configured to send a release signal of each level of the RCs to the RCM when an execution result of the RCA is obtained; and
    the RCM is configured to switch each level of the RCs corresponding to the release signal to a configuration required for a next operation task when receiving the release signal.

8. The reconfigurable processor according to claim 1, wherein
    the RCA is further configured to turn off power and clock of an idle RC.

9. The reconfigurable processor according to claim 1, wherein the preset order comprises that the timing control information is delivered from an upper level of RC to a lower level of RC in the RCA, or delivered arbitrarily between RCs of a same level in the RCA.

10. A timing control method of a reconfigurable processor, wherein the reconfigurable processor comprises a reconfigurable cell array RCA including a plurality of reconfigurable cells RCs and a control unit including a reconfigurable configuration manager RCM and a reconfigurable schedule manager RSM, and the method comprises:
    parsing, by the RCM, a configuration information and sending, by the RCM, a result of the parsing to the RCA to configure an operation function of at least a part of the RCs in the RCA;
    receiving, by the RSM, the configuration information from the RCM, generating, by the RSM, timing control information according to the configuration information, and sending, by the RSM the timing control information including a token to the RCA;
    starting executing, by an RC in the RCA, an operation when receiving the timing control information, and delivering, by the RC in the RCA, the timing control information to a next level of RC within the RCA according to a preset order after the operation is completed; and destroying, by the RCA, the timing control information, when the RCA completes an operation task corresponding to the timing control information, wherein the operation task includes operations executed by each level of the RCs receiving the timing control information.

11. The method according to claim 10, wherein the method further comprises:

stopping generating, by the RSM, the token and generating, by the RSM, a first blocking signal when a blocking occurs in a memory MEM and/or an output first-in-first-out register OFIFO; and suspending, by the RCA, a corresponding operation when the RC in the RCA receives the first blocking signal.

12. The method according to claim 11, wherein the method further comprises:

generating, by the RCM, a second blocking signal when parsing of a clock cycle has not been completed at the time the clock cycle arrives; and suspending, by the RCA, a corresponding operation when the RC in the RCA receives the second blocking signal.

13. The method according to claim 12, wherein after the RCM generates the second blocking signal, the method further comprises:

stopping generating, by the RSM, the token when the RSM monitors that the RCM generates the second blocking signal.

14. The method according to claim 11, wherein the method further comprises:

switching, by the RCM, the RC that has executed an operation corresponding to the timing control information to a configuration required for a next operation task when parsing of a clock cycle has been completed.

15. The method according to claim 10, wherein destroying the timing control information comprises:

writing, by the RC that receives the timing control information last in the RCA, an execution result of the operation task into OFIFO and/or MEM and destroying, by the RC that receives the timing control information last in the RCA, the timing control information when the operation task corresponding to the timing control information is completed.

16. The method according to claim 10, wherein after the RCA completes the operation task corresponding to the timing control information, the method further comprises:

sending, by the RSM, a release signal of each level of the RCs to the RCM when execution result of the RCA is obtained; and switching, by the RCM, each level of the RCs corresponding to the release signal to a configuration required for a next operation task when receiving the release signal.

17. The method according to claim 10, wherein the method further comprises:

turning off, by the RCA, power and clock of an idle RC.

18. The method according to claim 10, wherein the preset order comprises that the timing control information is delivered from an upper level of RC to a lower level of RC, or delivered arbitrarily between RCs of a same level in the RCA.

* * * * *